United States Patent
Buttridge et al.

(10) Patent No.: US 11,707,696 B2
(45) Date of Patent: Jul. 25, 2023

(54) LIQUID DISTRIBUTION SYSTEMS AND METHODS

(71) Applicant: GTI Solutions International LLC, Flower Mound, TX (US)

(72) Inventors: Ian Buttridge, Garland, TX (US); Kyeongho Jeong, Seoul (KR)

(73) Assignee: GTI Solutions International LLC, Flower Mound, TX (US)

( * ) Notice: Subject to any disclaimer, the term of this patent is extended or adjusted under 35 U.S.C. 154(b) by 0 days.

(21) Appl. No.: 17/396,745

(22) Filed: Aug. 8, 2021

(65) Prior Publication Data

US 2022/0040592 A1 Feb. 10, 2022

Related U.S. Application Data

(60) Provisional application No. 63/063,958, filed on Aug. 10, 2020.

(51) Int. Cl.
*B01D 53/18* (2006.01)
*B01D 3/00* (2006.01)

(52) U.S. Cl.
CPC ................................... *B01D 3/008* (2013.01)

(58) Field of Classification Search
CPC .............................. B01D 3/008; B01D 53/185
USPC .................................................. 261/97, 110
See application file for complete search history.

(56) References Cited

U.S. PATENT DOCUMENTS

| | | | | |
|---|---|---|---|---|
| 3,570,825 A * | 3/1971 | Eckert | .................... | B01D 3/008 261/96 |
| 3,937,769 A * | 2/1976 | Strigle, Jr. | ............. | B01D 3/008 261/114.1 |
| 4,140,625 A * | 2/1979 | Jensen | .................... | B01J 8/0492 261/DIG. 26 |
| 5,158,714 A * | 10/1992 | Shih | ........................ | B01D 3/008 422/220 |
| 5,192,465 A * | 3/1993 | Petrich | .................... | B01D 3/008 261/97 |
| 5,783,119 A * | 7/1998 | Ulrich | ....................... | F28F 25/02 261/97 |
| 6,371,454 B1 * | 4/2002 | Gerla | ........................ | B01D 3/20 261/114.5 |
| 7,972,570 B2 * | 7/2011 | Vieira | ....................... | B01J 19/26 216/96 |
| 9,399,229 B2 * | 7/2016 | Nascimento | ................ | B01J 8/02 |
| 10,792,635 B2 * | 10/2020 | Lee | ........................ | B01J 8/0446 |
| 10,900,507 B2 * | 1/2021 | Kumar | ....................... | B01J 4/005 |
| 2010/0019061 A1 * | 1/2010 | Kumar | ....................... | B05B 1/18 239/269 |

FOREIGN PATENT DOCUMENTS

FR 2 816 221 * 5/2002

* cited by examiner

*Primary Examiner* — Charles S Bushey

(57) ABSTRACT

A liquid distribution assembly includes a plate to collect liquid and a plurality of liquid distributors coupled to the plate. Each liquid distributor of the plurality of liquid distributors includes a conduit extending down from the plate. Liquid is to flow internal to the conduit from the plate. Each liquid distributor also includes a dome coupled to the conduit at an end of the conduit distal from the plate. The conduit defines openings disposed where the dome is coupled to the conduit permitting the liquid to flow from the conduit to the dome. The liquid is to flow over an edge of the dome.

17 Claims, 5 Drawing Sheets

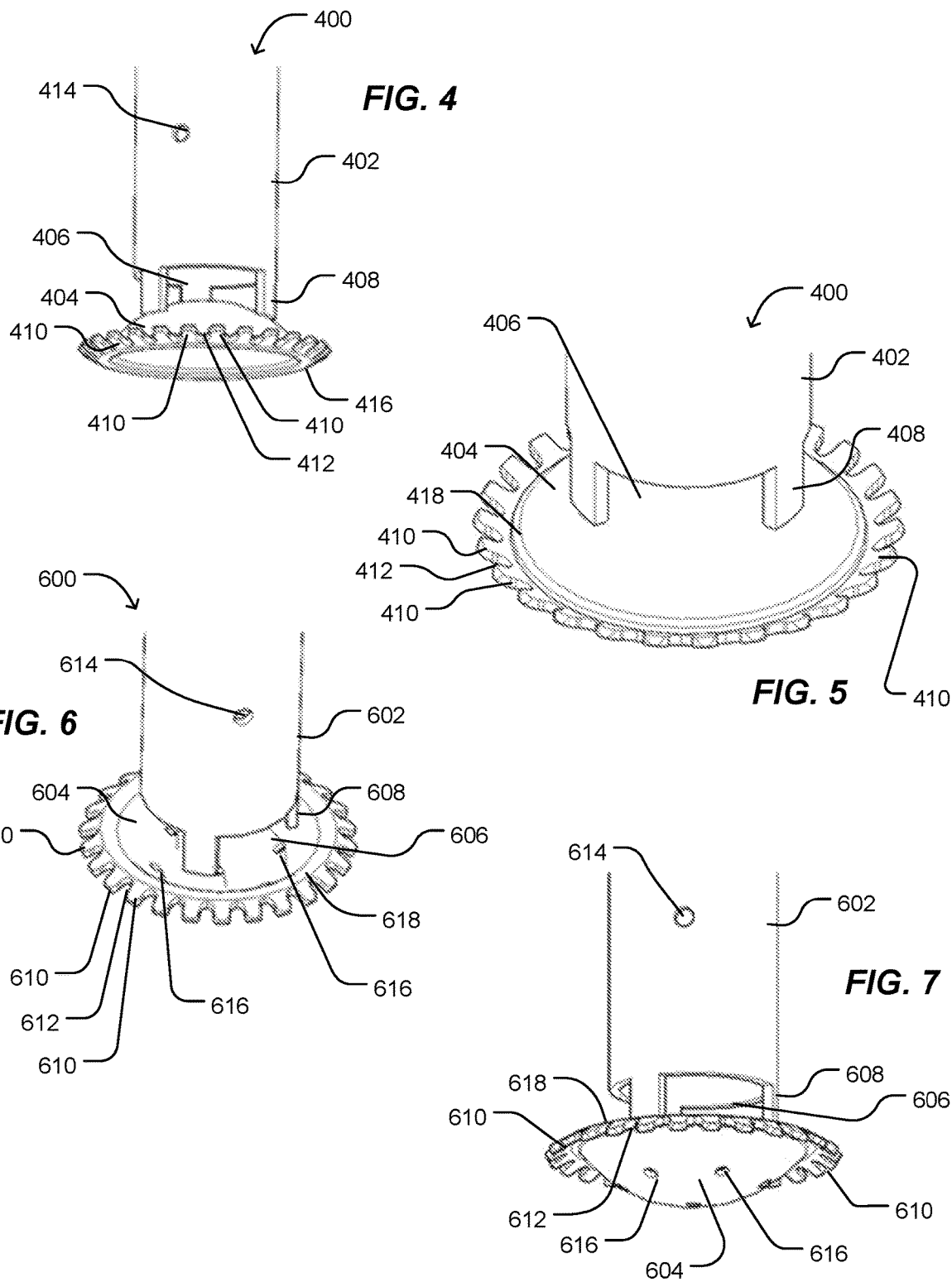

LIQUID DISTRIBUTION SYSTEMS AND METHODS

CROSS-REFERENCE TO RELATED APPLICATION(S)

This application claims benefit of U.S. Provisional Application No. 63/063,958, filed 10 Aug. 2020, which is incorporated herein by reference in its entirety.

FIELD OF THE DISCLOSURE

This disclosure, in general, relates to liquid distributors, particularly for use in separation columns.

BACKGROUND

Many systems utilize the distribution of liquid over an area. Examples of such systems include separation systems such as distillation columns and absorber columns, reactors having catalytic beds, and bioreactors, such as those used for waste processing. For example, distillation columns and absorber columns utilize the distribution of liquid over packing to facilitate efficient exchange between gases and liquids. Waste management bioreactors utilize the distribution of liquid over a fixed bed of support structures on or in which microbes grow and process waste materials within a liquid.

However, existing liquid distribution systems provide less than uniform distribution of liquid over an area. In distillation columns, such poor distribution of liquid over a packed column results in sections of the column lacking sufficient liquid to facilitate mass transfer. In other words, poor distribution leads to inefficiencies and poor separation. Similarly, in absorption columns, poor distribution of liquid results in inefficient mass transfer, and thus poor separation of components. In the case of fixed-bed bioreactors, poor distribution of liquid results in portions of the bioreactor remaining dry, thus limiting microbial growth and the remediation of waste.

As such, and improved liquid distribution system would be desirable.

BRIEF DESCRIPTION OF THE DRAWINGS

The present disclosure may be better understood, and its numerous features and advantages made apparent to those skilled in the art by referencing the accompanying drawings.

FIG. 4, FIG. 5, FIG. 6, FIG. 7, FIG. 8, and FIG. 9 include illustrations of portions of example liquid distributors.

The use of the same reference symbols in different drawings indicates similar or identical items.

DETAILED DESCRIPTION

In an embodiment, the system includes a plate and a plurality of liquid distributors coupled to the plate. Liquid distributors receive liquid from the plate for distribution. Each liquid distributor of the plurality of liquid distributors includes a conduit extending downward from the plate or approximately vertical. The conduit is coupled to a dome that receives liquid from the conduit. The liquid flows to an edge of the dome where it is distributed around a circumference of the edge of the dome. In an example, a convex surface of the dome is oriented upward, and the liquid flows over the convex surface of the dome to an edge of the dome. In another example, the dome has a concave surface that is oriented upward, like a bowl, and the liquid flows from the conduit into the concave surface of the dome. Optionally, a plurality of tabs are distributed around a circumference at the edge of the dome. Valleys are formed between adjacent tabs, and liquid flows through the valleys between the tabs. In an example, the system is a separation system, such as a distillation column or absorber column. In particular, the separation system can include packing. In another example, the system is a reactor. In a further example, the system is a bioreactor.

The liquid distribution plate has use in various systems. In particular, the liquid distribution plate can be used in systems incorporating a fixed media, such as separations packing in a separation system, a catalyst bed in a reactor, or a support medium for bioreactors.

Figure 1:
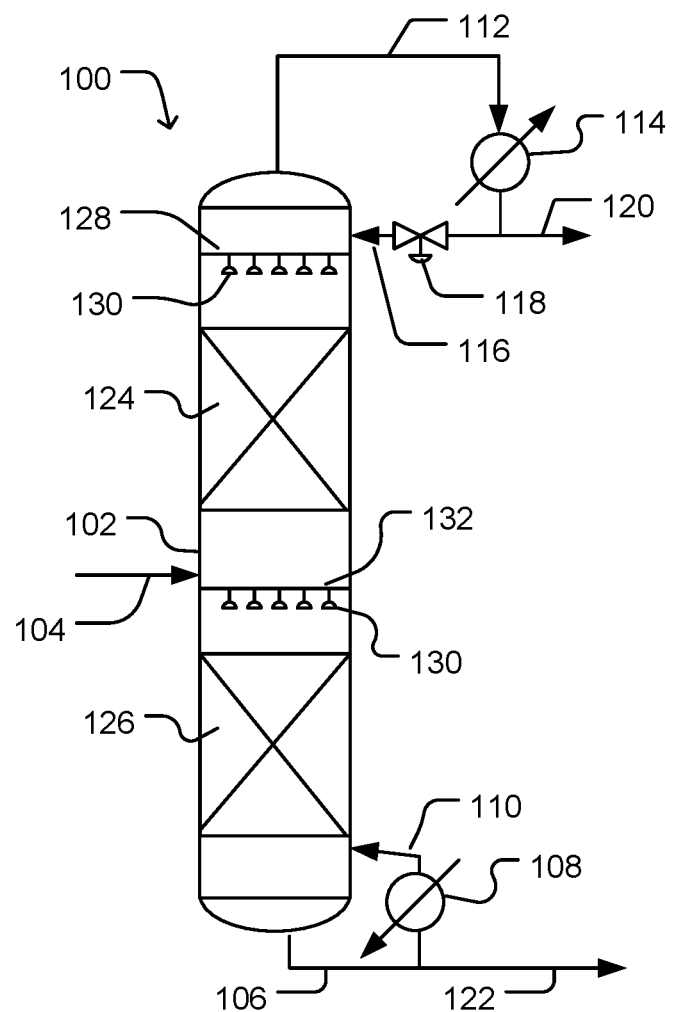
FIG. 1 includes an illustration of an example separation system incorporating a liquid distribution plate.

In an example, FIG. 1 illustrates a separation system 100, such as a distillation column. In an example, the separation system 100 includes a column 102 with a liquid inlet 104. The column 102 also includes a liquid outlet 106 providing liquid to a re-boiler 108 that provides vapor through vapor return 110 to the column 102. A portion of the liquid traversing the outlet 106 can be provided as a product stream 122.

The column 102 also includes a vapor outlet 112 to a condenser 114. A portion of liquid flowing from the condenser 114 can be provided back to the column through valve 118 and liquid return 116. In an example, the valve 118 can control a reflux rate of the column 102. Another portion of the liquid leaving the condenser 114 can be provided as a product stream 120.

The separation column 102 can further include packing or separation trays. In the illustrated example, the column 102 includes packing such as a packed stripping section 126 and a packed rectifying section 124.

Liquid inlet 104 can provide liquid onto a distribution plate 132 that includes a plurality of liquid distributors 130. The liquid distributors 130 distribute liquid over the packing 126. Similarly, the liquid return 116 from the condenser 114 can be provided onto a liquid distribution plate 128 that includes a plurality of liquid distributors 130. The liquid distributors 130 can distribute liquid over the packing 124. In a particular example, the liquid distributors 130 include a conduit through which liquid flows onto a dome disposed at an end of the conduit distal from the plate. Liquid drips from the periphery or an edge of the dome over the packing 124 or 126.

Figure 2:
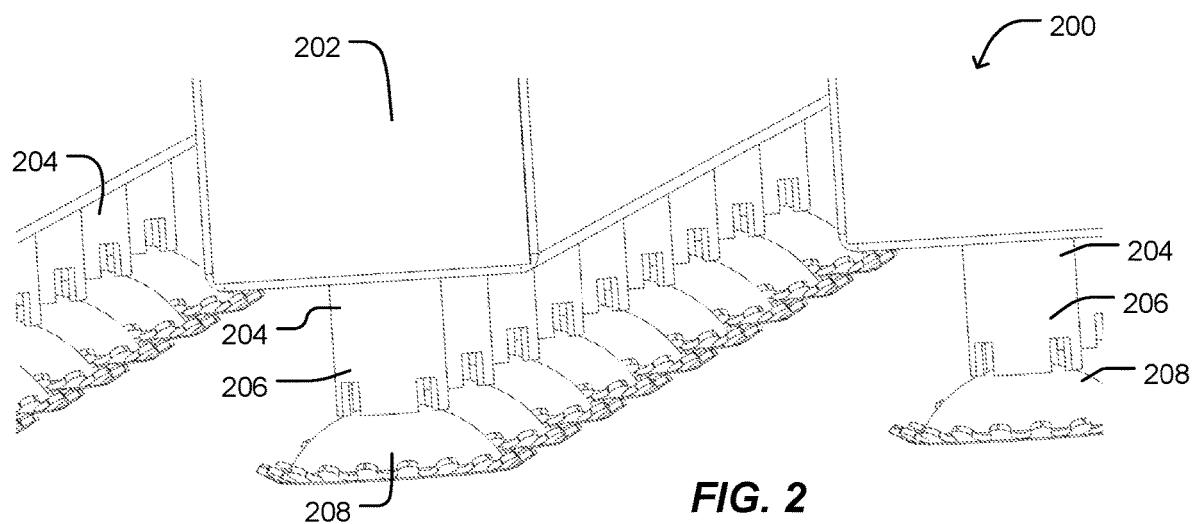
FIG. 2 and FIG. 3 include illustrations of example liquid distribution plates.
Figure 3:
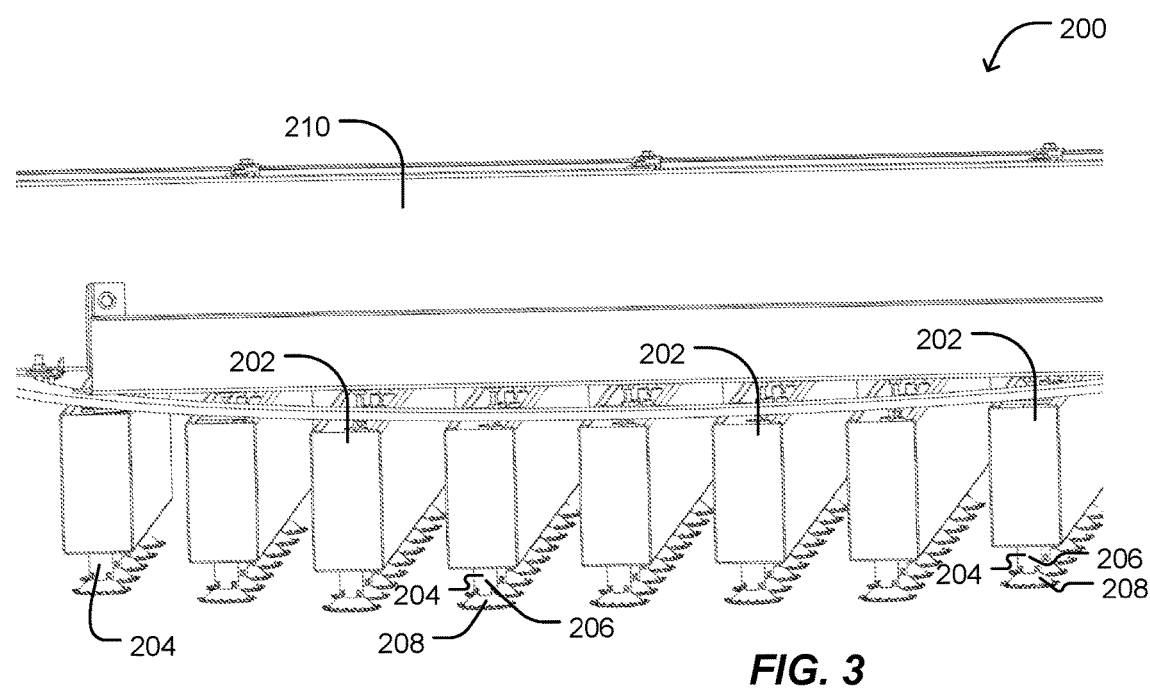

FIG. 2 and FIG. 3 illustrate an example liquid distribution plate 200. The plate 200 can include a tray or troughs 202 and a plurality of liquid distributors 204. Each liquid distributor 204 can include a conduit 206 through which fluid flows to a dome 208 disposed at an end of the conduit 206 distal from the tray or troughs 202. The conduits 206 can extend down from the tray or troughs 202, for example, approximately vertically.

Liquid flowing through the conduit 206 flows across the dome 208 to an edge of the dome 208 where it is distributed around the circumference of the edge and drips onto the structures below. In the illustrated embodiment, the plurality of liquid distributors 204 extend through a set of troughs 202 that are in fluid communication with a central trough 210. In an alternative example, the plurality of liquid distributors 204 can extend through a uniform tray.

FIG. 4 and FIG. 5 illustrate an embodiment of a liquid distributor 400. The liquid distributor 400 includes a conduit 402 connected to a dome 404 at an end of the conduit 402 distal from and below the plate. The conduit extends approximately vertically, for example, within 30° of a vector of gravity, such as parallel to the vector of gravity.

In the embodiment illustrated in FIG. 4, the dome 404 includes a convex surface extending upward and connecting to the conduit 402. The conduit 402 extends up into a liquid distribution plate, such as a set of troughs or a tray. Liquid can enter an opening 414 and flow through the inside of the conduit 402. The conduit 402 includes tabs 408 coupled to the dome 404. Between the tabs 408, the conduit 402 forms openings 406 through which liquid can flow onto the upward-facing convex surface of the dome 404. Alternatively, the conduit 402 can extend to the surface of the plate, and holes within the plate can provide liquid internal to the conduit.

The dome 404 includes an edge 416. Liquid is distributed around the edge 416 of the dome 404 and drips onto surfaces below the edge 416 of the dome 404. In an example, the edge defines a plane that is approximately horizontal, for example, perpendicular to the vector of gravity.

Optionally, a set of tabs 410 are attached to the edge 416 of the dome 404. Between adjacent tabs 410 are valleys 412. In an example, the tabs 410 can extend within a plane of the edge 416. In another example, the tabs 410 can extend below the plane defined by the edge 416. In the illustrated example of FIG. 4 and FIG. 5, the tabs 410 extend upward out of a plane that includes the edge 416 of the dome 404. As such, the tabs 410 can form a channel 418 around the edge 416 of the dome 404 that assists with distributing liquid to the valleys 412 between the tabs 410.

An alternative embodiment is illustrated in FIG. 6 and FIG. 7. A liquid distributor 600 includes a conduit 602 coupled to a dome 604 at an end of the conduit 602 distal from and below the plate. A concave surface of the dome 604 faces upward towards the conduit 602, like a bowl. Where the conduit 602 attaches to the dome 608, openings 606 can permit liquid flowing within the conduit 602 to enter the dome 604. For example, the conduit 602 of the liquid distributor 600 can extend through a bottom surface of a plate. Liquid can enter an opening 614 and travel through the conduit 602 to the opening 606 and onto the concave surface of the dome 604. Alternatively, the conduit 602 can extend to the surface of the plate, and holes within the plate can provide liquid internal to the conduit 602. The liquid can flow to an edge 618 of the dome 604 and drip onto structures below the liquid distributor 600.

Optionally, the dome 604 can be coupled to tabs 610. Adjacent tabs 610 can form valleys 612. The tabs 610 can extend within a plane including the edge 618. Alternatively, the tabs 610 can extend above the plane. In the illustrated example, the tabs 610 extend below a plane including the edge 618. Liquid flows from the conduit and into the concave surface of the dome 604 and flows to the edge 618 and out the valleys 612 between the tabs 610.

In a further example, a plurality of holes 616 can be defined though the dome 604. Liquid can flow through the holes 616 of the dome 604 providing additional distribution of the liquid over the structures below.

The surface of the dome can be modified to include structures or materials that alter the flow of liquid over the surface of the dome or to further enhance contact between liquid flowing over the dome and vapor within the system.

Figure 8:
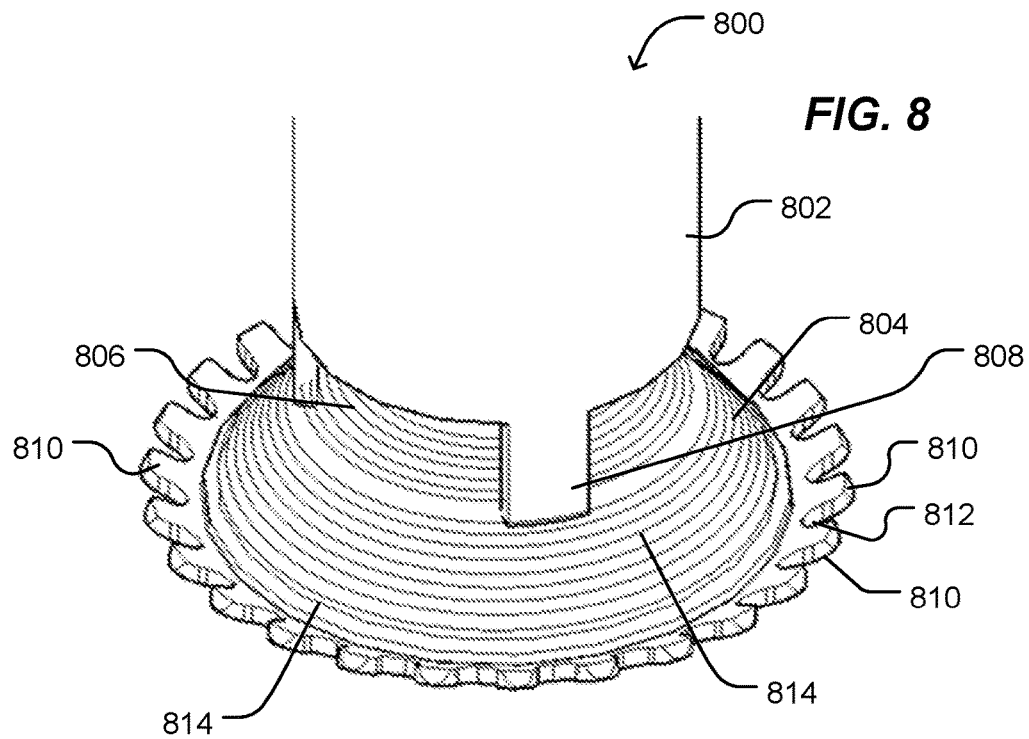

For example, as illustrated in FIG. 8, a liquid distributor 800 includes a conduit 802 attached to a dome 804. In the illustrated example, the dome 804 has a convex surface facing upward. The conduit 802 connects to the dome 804 with tabs 808 and defines openings 806 between the tabs 808 to permit liquid to flow out from the inside of the conduit 802 onto the convex surface of the dome 804. The dome 804 can further include tabs 810 defining valleys 812 between adjacent tabs 810.

The surface of the dome 804 can be machined with latitudinal structures 814, such as scoring, channels, terraces, joggles, or other structures. For example, the latitudinal structures 814 can be machined or etched into the upward-facing convex surface of the dome 804. In another example, the latitudinal structures 814 can be concentric circles added either via a joggle in the material or by circular etching via a CNC machine or laser. In further example, longitudinal structures, such as grooves, channels, or scoring, can be formed within the upward-facing convex surface of the dome 804.

Figure 9:
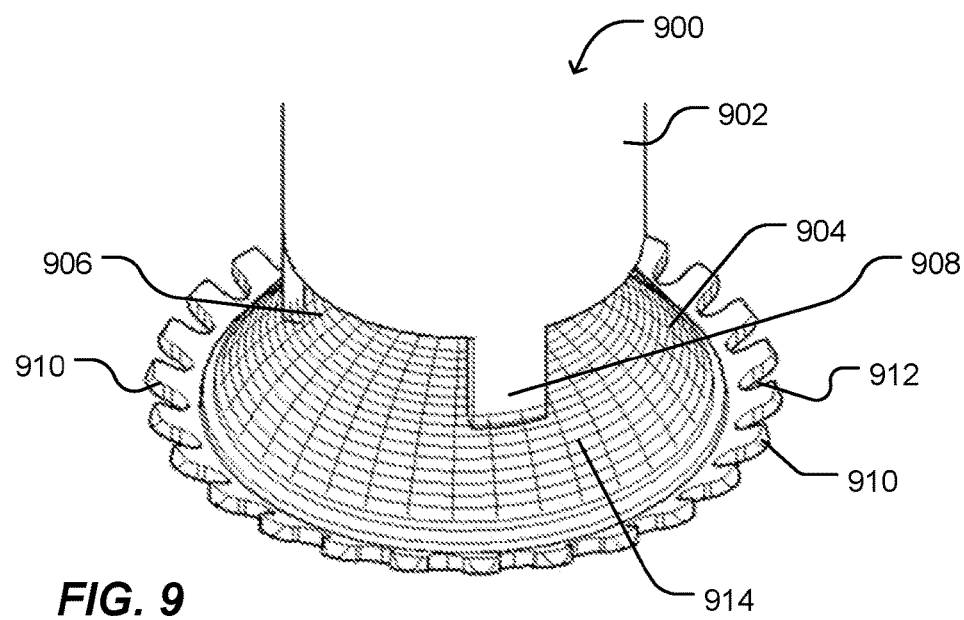

In a further example illustrated in FIG. 9, a liquid distributor 900 includes a conduit 902 connected to a dome 904 having an upward-facing convex surface. An opening 906 between tabs 908 connecting the conduit 902 to the dome 904 permits liquid to flow out of the conduit 902 over the upward-facing convex surface of the dome 904. The dome 904 can include tabs 910 and valleys 912 defined between adjacent tabs 910.

In an example, a mesh or gauze 914 can be applied over the upward-facing convex surface of the dome 904. In an example, such a mesh or gauze 914 can enhance contact between liquid flowing out of the conduit 902 and over the surface of the dome 904 and vapor traveling upward in a separation system and optionally through the conduit 902. For example, gauze can be tacked onto the upward-facing convex surface.

Figure 10:
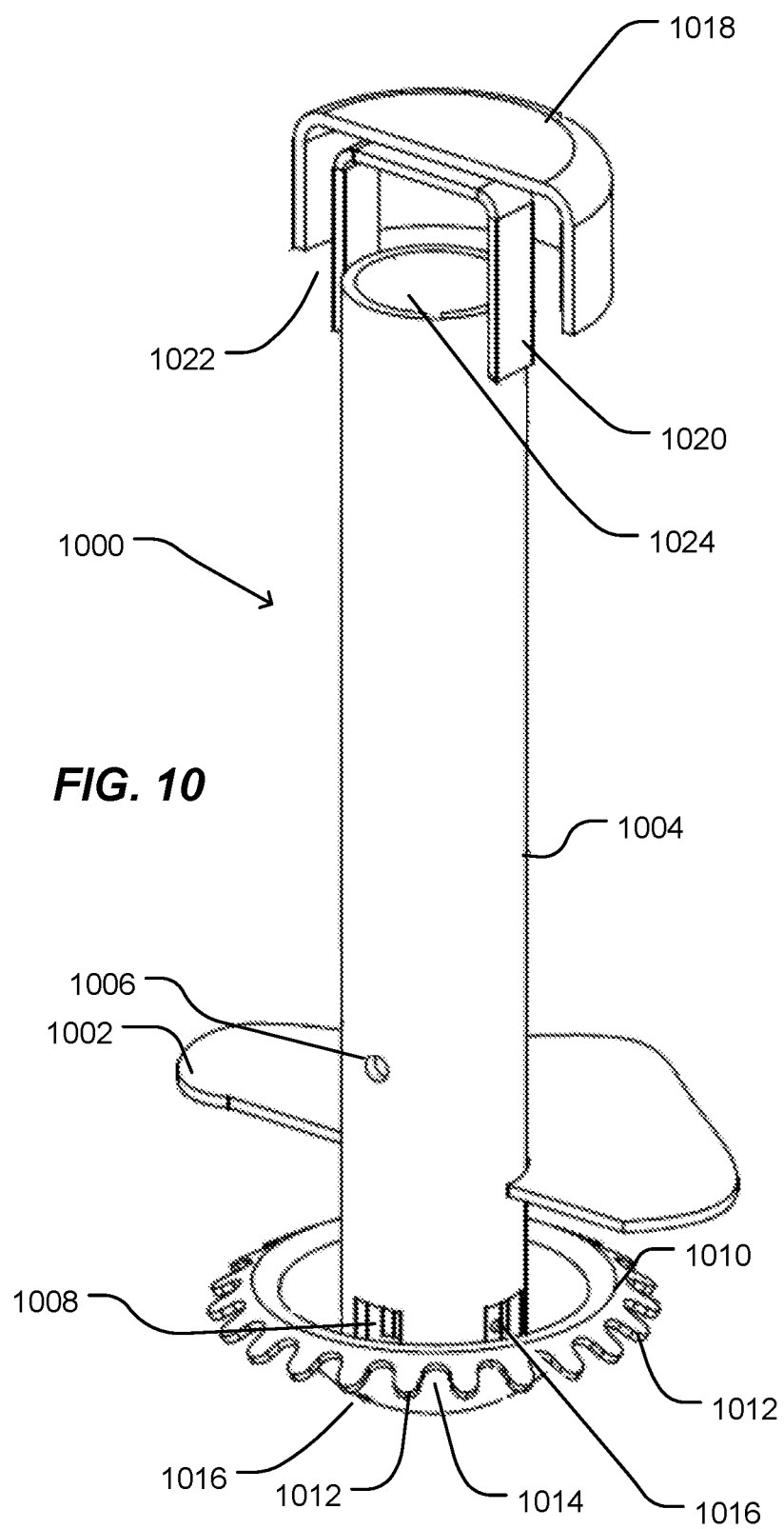
FIG. 10 includes an illustration of an example plate and liquid distributor.

FIG. 10 includes a further example of a liquid distribution system. The liquid distribution system can include a plate, such as a tray or conduit having a structure 1002 defining a bottom surface of the plate. The liquid distributor 1000 can include a conduit 1004 extending through the structure 1002. The conduit 1004 is coupled to a dome 1010 at an end of the conduit 1004 distal from and below the structure 1002.

In the illustrated example, the dome 1010 has an upward-facing concave surface. Alternatively, the dome 1010 can have an upward-facing convex surface. The dome 1010 can include tabs 1012 defining valleys 1014 between adjacent tabs and extending from an edge of the dome 1010. The valleys 1014 define drip points. Optionally, the dome 1010 can define openings 1016 through which liquid can flow, providing further distribution of fluid over the structures below. Such openings 1016 can have small hole sizes in a range of 1.0 mm to 3.0 mm, allowing for effectively more drip points.

The conduit 1004 can include openings 1006 disposed above the structure 1002. As such, liquid disposed above the structure 1002 can flow through the opening 1006 and inside of the conduit 1004 and down out of an opening 1008 where the conduit 1004 attaches to the dome 1010. Liquid can flow over an edge of the dome 1010, for example, through valleys 1014 defined between tabs 1012. In another example, liquid can flow through openings 1016 defined through the dome 1010.

Optionally, for example, in a separation system, vapor can flow upward through the column. For example, the vapor can flow through the openings 1008 into the conduit 1004, and thus through the plate structure 1002. Optionally, the conduit 1004 can extend well above the structure 1002 and provide an opening 1024 through which vapor can traverse. In example, the opening includes a cap 1018. For example, a support 1020 can be attached to the conduit 1004 and the cap 1018 can be applied over the support 1020 and define an opening 1022 in communication with the opening 1024 to the inside of the conduit 1004. As such, the liquid distributor 1000 can provide distribution of liquid from the liquid distribution plate and permit vapor to traverse the liquid distribution plate.

In a particular example, a distributor assembly includes a distributor plate adapted for horizontal positioning and securement to a process column liquid distributor for the discharge of liquid from multiple additional points. The distributor plate comprises a member having dome shape with multiple tabs around the periphery of the dome to achieve additional drip points. The distributor plate is constructed for collecting liquid, spreading the liquid into multiple drip points, and affording low velocity equal discharge of liquid therefrom into a packing bed therebeneath.

In an example, the dome, whether having an upward-facing convex surface or an upward-facing concave surface, can have a vertical cross-section that is curved. For example, the vertical cross-section can be partially circular, parabolic, or another curved shaped.

In a first aspect, a liquid distribution assembly includes a plate to collect liquid and a plurality of liquid distributors coupled to the plate. Each liquid distributor of the plurality of liquid distributors includes a conduit extending down from the plate. Liquid is to flow internal to the conduit from the plate. Each liquid distributor includes a dome coupled to the conduit at an end of the conduit distal from the plate. The conduit defines openings disposed where the dome is coupled to the conduit, permitting the liquid to flow from the conduit to the dome. The liquid is to flow over an edge of the dome.

In a second aspect, a separation column includes a packing bed and a liquid distribution assembly. The liquid distribution assembly includes a plate to collect liquid and a plurality of liquid distributors coupled to the plate. Each liquid distributor of the plurality of liquid distributors includes a conduit extending down from the plate. Liquid is to flow internal to the conduit from the plate. Each liquid distributor includes a dome coupled to the conduit at an end of the conduit distal from the plate. The conduit defines openings disposed where the dome is coupled to the conduit, permitting the liquid to flow from the conduit to the dome. The liquid is to flow over an edge of the dome.

In a third aspect, a method for distributing liquid includes applying liquid to a liquid distribution plate. The liquid distribution plate includes a plate to collect liquid and a plurality of liquid distributors coupled to the plate. Each liquid distributor of the plurality of liquid distributors includes a conduit extending down from the plate. Liquid is to flow internal to the conduit from the plate. Each liquid distributor includes a dome coupled to the conduit at an end of the conduit distal from the plate. The conduit defines openings disposed where the dome is coupled to the conduit, permitting the liquid to flow from the conduit to the dome. The liquid is to flow over an edge of the dome.

In an example of the first, second, and third aspects, a convex surface of the dome is oriented upward and the liquid flows from the conduit over the convex surface of the dome. For example, the convex surface includes latitudinal structures. In another example, the convex surface includes longitudinal structures. In a further example, the convex surface includes scoring. In an additional example, the liquid distribution assembly further includes gauze disposed over the convex surface.

In another example of the first, second, and third aspects and the above examples, the edge of the dome further includes a plurality of tabs distributed around the circumference of the edge. For example, adjacent tabs of the plurality of tabs define a valley therebetween. In an example, the plurality of tabs extend from the edge upward out of a horizontal plane of the edge of the dome. In another example, the plurality of tabs extend from the edge downward from a horizontal plane of the edge of the dome.

In a further example of the first, second, and third aspects and the above examples, a concave surface of the dome is oriented upward and the liquid flows from the conduit over the concave surface of the dome. In an example. the dome further includes holes distributed through the dome.

In an additional example of the first, second, and third aspects and the above examples, a conduit of a liquid distributor of the plurality of liquid distributors extends through the plate, the conduit defining at least one hole to receive liquid disposed on the plate.

In another example of the first, second, and third aspects and the above examples, the plate is formed of a plurality of troughs, a set of liquid distributors of the plurality of liquid distributors coupled to a trough of the plurality of troughs.

In a further example of the first, second, and third aspects and the above examples, the plate is formed of a horizontal tray.

In an additional example of the first, second, and third aspects and the above examples, the liquid distribution assembly further includes a cap disposed over an upper end of the conduit, the cap defining an opening in communication with the interior of the conduit.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A liquid distribution assembly comprising:
   a plate to collect liquid; and
   a plurality of liquid distributors coupled to the plate, each liquid distributor of the plurality of liquid distributors comprising:
      a conduit extending down from the plate, liquid to flow internal to the conduit from the plate; and
      a dome coupled to the conduit at an end of the conduit distal from the plate, the conduit defining openings disposed where the dome is coupled to the conduit permitting the liquid to flow from the conduit to the dome, the liquid to flow over an edge of the dome, wherein the edge of the dome further includes a plurality of tabs distributed around the circumference of the edge, the plurality of tabs extending from the edge upward out of a horizontal plane of the edge of the dome.

2. The liquid distribution assembly of claim 1, wherein a convex surface of the dome is oriented upward and the liquid flows from the conduit over the convex surface of the dome.

3. The liquid distribution assembly of claim 2, wherein the convex surface includes latitudinal structures.

4. The liquid distribution assembly of claim 2, wherein the convex surface includes longitudinal structures.

5. The liquid distribution assembly of claim 2, wherein the convex surface includes scoring.

6. The liquid distribution assembly of claim 2, further comprising gauze disposed over the convex surface.

7. The liquid distribution assembly of claim 1, wherein adjacent tabs of the plurality of tabs define a valley therebetween.

8. The liquid distribution assembly of claim 1, wherein a concave surface of the dome is oriented upward and the liquid flows from the conduit into the concave surface of the dome.

9. The liquid distribution assembly of claim 8, wherein the dome further includes holes distributed through the dome.

10. The liquid distribution assembly of claim 1, wherein a conduit of a liquid distributor of the plurality of liquid distributors extends through the plate, the conduit defining at least one hole to receive liquid disposed on the plate.

11. The liquid distribution assembly of claim 1, wherein the plate is formed of a plurality of troughs, a set of liquid distributors of the plurality of liquid distributors coupled to a trough of the plurality of troughs.

12. The liquid distribution assembly of claim 1, wherein the plate is formed of a horizontal tray.

13. The liquid distribution assembly of claim 1, further including a cap disposed over an upper end of the conduit, the cap defining an opening in communication with the interior of the conduit.

14. A separation column comprising:
   a packing bed; and
   a liquid distribution assembly comprising:
      a plate to collect liquid; and
      a plurality of liquid distributors coupled to the plate, each liquid distributor of the plurality of liquid distributors comprising:
         a conduit extending down from the plate, liquid to flow internal to the conduit from the plate; and
         a dome coupled to the conduit at an end of the conduit distal from the plate, the conduit defining openings disposed where the dome is coupled to the conduit permitting the liquid to flow from the conduit to the dome, the liquid to flow over an edge of the dome, wherein the edge of the dome further includes a plurality of tabs distributed around the circumference of the edge, the plurality of tabs extending from the edge upward out of a horizontal plane of the edge of the dome.

15. The separation column of claim 14, wherein a convex surface of the dome is oriented upward and the liquid flows from the conduit over the convex surface of the dome.

16. The separation column of claim 15, wherein the convex surface includes latitudinal structures.

17. A method for distributing liquid, the method comprising:
   applying liquid to a liquid distribution plate, the liquid distribution plate including:
      a plate to collect liquid; and
      a plurality of liquid distributors coupled to the plate, each liquid distributor of the plurality of liquid distributors comprising:
         a conduit extending down from the plate, liquid to flow internal to the conduit from the plate; and
         a dome coupled to the conduit at an end of the conduit distal from the plate, the conduit defining openings disposed where the dome is coupled to the conduit permitting the liquid to flow from the conduit to the dome, the liquid to flow over an edge of the dome, wherein the edge of the dome further includes a plurality of tabs distributed around the circumference of the edge, the plurality of tabs extending from the edge upward out of a horizontal plane of the edge of the dome.

* * * * *